(12) United States Patent
Liu et al.

(10) Patent No.: US 8,787,385 B2
(45) Date of Patent: *Jul. 22, 2014

(54) METHOD AND APPARATUS FOR DETERMINING CHANNEL BANDWIDTH

(75) Inventors: Yong Liu, Campbell, CA (US); Harish Ramamurthy, Sunnyvale, CA (US); Raja Banerjea, Sunnyvale, CA (US)

(73) Assignee: Marvell World Trade Ltd., St. Michael (BB)

(*) Notice: Subject to any disclaimer, the term of this patent is extended or adjusted under 35 U.S.C. 154(b) by 190 days.

This patent is subject to a terminal disclaimer.

(21) Appl. No.: 13/152,044

(22) Filed: Jun. 2, 2011

(65) Prior Publication Data

US 2011/0305156 A1    Dec. 15, 2011

Related U.S. Application Data

(60) Provisional application No. 61/354,021, filed on Jun. 11, 2010, provisional application No. 61/362,238, filed on Jul. 7, 2010, provisional application No. 61/380,911, filed on Sep. 8, 2010, provisional application No. 61/389,631, filed on Oct. 4, 2010, provisional application No. 61/390,978, filed on Oct. 7, 2010, provisional application No. 61/407,269, filed on Oct. 27, 2010, provisional application No. 61/409,812, filed on Nov. 3, 2010, provisional application No. 61/412,361, filed on Nov. 10, 2010, provisional application No. 61/415,778, filed on Nov. 19, 2010.

(51) Int. Cl.
*H04L 12/28* (2006.01)
*H04L 12/56* (2006.01)

(52) U.S. Cl.
CPC ............. *H04L 47/24* (2013.01); *H04L 47/50* (2013.01)
USPC .................. 370/395.21; 370/395.41; 370/477

(58) Field of Classification Search
CPC .......... H04L 47/24; H04L 47/70; H04L 45/50
USPC ................. 370/348, 254, 328, 329, 252, 253, 370/395.21, 395.41, 477
See application file for complete search history.

(56) References Cited

U.S. PATENT DOCUMENTS

| 5,613,194 | A | 3/1997 | Olds et al. |
| 6,169,761 | B1 | 1/2001 | Marcoccia et al. |

(Continued)

OTHER PUBLICATIONS

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, Nov. 7, 2001.

(Continued)

*Primary Examiner* — Chuong T Ho

(57) ABSTRACT

In a method implemented in a first communication device, a control frame having a bandwidth is generated. The control frame is transmitted via a first composite communication channel, wherein the first composite communication channel comprises a plurality of communication channels. A bandwidth of a response frame, received from a second communication device in response to transmitting the control frame, is determined. A second composite communication channel based on the bandwidth of the response frame is determined, wherein the second composite communication channel comprises at least one communication channel from the plurality of communication channels. One or more data frames are transmitted to the second communication device via the second composite communication channel.

26 Claims, 14 Drawing Sheets

(56) References Cited

U.S. PATENT DOCUMENTS

| | | | |
|---|---|---|---|
| 8,345,584 B2* | 1/2013 | Rohfleisch et al. | 370/310 |
| 2006/0146869 A1 | 7/2006 | Zhang et al. | |
| 2006/0217125 A1 | 9/2006 | Miyazaki | |
| 2006/0268760 A1* | 11/2006 | Fang et al. | 370/328 |
| 2007/0008884 A1 | 1/2007 | Tang | |
| 2007/0060155 A1 | 3/2007 | Kahana et al. | |
| 2007/0070922 A1* | 3/2007 | Benveniste | 370/254 |
| 2008/0080553 A1* | 4/2008 | Hasty et al. | 370/468 |
| 2008/0112340 A1 | 5/2008 | Luebke | |
| 2008/0192644 A1 | 8/2008 | Utsunomiya et al. | |
| 2009/0059877 A1 | 3/2009 | Utsunomiya et al. | |
| 2009/0067403 A1* | 3/2009 | Chan et al. | 370/343 |
| 2009/0285116 A1 | 11/2009 | Nanda et al. | |
| 2010/0142468 A1* | 6/2010 | Cheong et al. | 370/329 |
| 2011/0194542 A1* | 8/2011 | Kim et al. | 370/338 |
| 2011/0305156 A1 | 12/2011 | Liu et al. | |
| 2011/0305288 A1* | 12/2011 | Liu et al. | 375/260 |
| 2011/0310930 A1 | 12/2011 | Gerhardt et al. | |
| 2012/0057492 A1 | 3/2012 | Goel et al. | |
| 2012/0057534 A1* | 3/2012 | Park | 370/329 |
| 2012/0082040 A1* | 4/2012 | Gong et al. | 370/252 |
| 2012/0082045 A1 | 4/2012 | Liu et al. | |
| 2012/0082056 A1 | 4/2012 | Horisaki et al. | |
| 2012/0082147 A1 | 4/2012 | Liu et al. | |
| 2013/0070668 A1* | 3/2013 | Merlin et al. | 370/328 |

OTHER PUBLICATIONS

IEEE Std 802.11g/D8.2, Apr 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.*, Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

"IEEE Std. 802.11 n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

Partial International Search report for International Application No. PCT/US2011/038929, dated Feb. 16, 2012.

Yuan, et al., "Carrier Aggregation for LTE-Advanced Mobile Communication Systems," IEEE Communications Magazine, pp. 88-93, Feb. 2010.

Cariou, et al., "Multi-channel Transmissions," Doc. No. IEEE 802.11-09/1022r0, *The Institute of Electrical and Electronics Engineers, Inc.*, Sep. 2009.

Noh, et al., "Channel Selection and Management for 11ac," Doc. No. IEEE 802.11-10/0593r1, *The Institute of Electrical and Electronics Engineers, Inc.*, May 20, 2010.

Hiertz, et al., "The IEEE 802.11 Universe," IEEE Communications Magazine, pp. 62-70, Jan. 2010.

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (Phy) specifications: Amendment 4: Enhancements for Higher Throughput," *the Institute of Electrical and Electronics Engineers, Inc.*, Sep. 2007.

U.S. Appl. No. 13/034,409, Liu et al., filed Feb. 24, 2011.

U.S. Appl. No. 13/034,421, Liu et al., filed Feb. 24, 2011.

Park, "IEEE 802.11ac: Dynamic Bandwidth Channel Access," 2011 Int'l Conf. on Communications (ICC), pp. 1-5, 2011.

Redieteab, et al., "Cross-Layer Multichannel Aggregation for Future WLAN Systems," 2010 IEEE Int'l Conf.. on Communication Systems (ICCS), pp. 740-745, Nov. 2010.

Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.

International Search Report and Written Opinion for International Application No. PCT/US2011/038929, dated Jun. 14, 2012.

Zhang et al., "11ac Explicit Sounding and Feedback", *The Institute of Electrical and Electronics Engineers*, doc. No. IEEE 802.11-10/1105r0, (Sep. 2010).

Stacey et al., "Specification Framework for TGac," document No. IEEE 802.11-09/0992r20, *Institute for Electrical and Electronics Engineers*, pp. 1-49, Jan. 18, 2011.

Stacey et al., "IEEE P802.11, Wireless LANs, Proposed TGac Draft Amendment," Institute of Electrical and Electronics Engineers, doc. No. IEEE 802.11-10/1361r3 (Jan. 2011).

P802.11ac/D2.0, Draft Standard for Information Technology—Telecommunications and information exchange between systems—Local and metropolitan area networks—Specific Requirements, Part 11: Wireless LAN Medium Access Control (MAC) and Physical Layer (PHY) specifications, Amendment 4: Enhancements for Very High Throughput for Operation in Bands below 6 GHz, Institute for Electrical and Electronics Engineers, Jan. 2012.

P802.11ac/D3.0, Draft Standard for Information Technology—Telecommunications and information exchange between systems—Local and metropolitan area networks—Specific Requirements, Part 11: Wireless LAN Medium Access Control (MAC) and Physical Layer (PHY) specifications, Amendment 4: Enhancements for Very High Throughput for Operation in Bands below 6 GHz, Institute for Electrical and Electronics Engineers, Jun. 2012.

P802.11ac/D4.0, Draft Standard for Information Technology—Telecommunications and information exchange between systems—Local and metropolitan area networks—Specific Requirements, Part 11: Wireless LAN Medium Access Control (MAC) and Physical Layer (PHY) specifications, Amendment 4: Enhancements for Very High Throughput for Operation in Bands below 6 GHz, Institute for Electrical and Electronics Engineers, Oct. 2012.

P802.11ac/D5.0, Draft Standard for Information Technology—Telecommunications and information exchange between systems—Local and metropolitan area networks—Specific Requirements, Part 11: Wireless LAN Medium Access Control (MAC) and Physical Layer (PHY) specifications, Amendment 4: Enhancements for Very High Throughput for Operation in Bands below 6 GHz, Institute for Electrical and Electronics Engineers, Jan. 2013.

P802.11ac/D6.0, Draft Standard for Information Technology—Telecommunications and information exchange between systems—Local and metropolitan area networks—Specific Requirements, Part 11: Wireless LAN Medium Access Control (MAC) and Physical Layer (PHY) specifications, Amendment 4: Enhancements for Very High Throughput for Operation in Bands below 6 GHz, Institute for Electrical and Electronics Engineers, Jul. 2013.

(56) References Cited

OTHER PUBLICATIONS

Stacey et al., "Specification Framework for TGac," document No. IEEE 802.11-09/0992r21, Institute for Electrical and Electronics Engineers, Jan. 19, 2011.
Stacey et al., "Specification Framework for TGac," document No. IEEE 802.11-09/0992r18, Institute for Electrical and Electronics Engineers, Sep. 16, 2010.
International Search report and Written Opinion for International Application No. PCT/US2011/053437, dated Jun. 14, 2012.
Partial International Search Report for International Application No. PCT/US2011/053437, dated Feb. 8, 2012.
Liu et al., U.S. Appl. No. 13/034,409, filed Feb. 24, 2011.
Liu et al., U.S. Appl. No. 13/152,040, filed Jun. 6, 2011.
Office Action in U.S. Appl. No. 13/034,409, dated May 16, 2013.
Office Action in U.S. Appl. No. 13/034,421, dated Jan. 22, 2013.
Office Action in U.S. Appl. No. 13/034,421, dated Sep. 3, 2013.
Office Action in U.S. Appl. No. 13/152,040, dated Apr. 8, 2013.
Office Action in U.S. Appl. No. 13/246,351, dated Aug. 30, 2013.
Office Action in U.S. Appl. No. 13/246,469, dated Jun. 10, 2013.
Office Action in U.S. Appl. No. 13/246,469, Liu et al., mailed Jun. 10, 2013.
Office Action in U.S. Appl. No. 13/034,421, Liu et al., dated Jan. 22, 2013.
Office Action in U.S. Appl. No. 13/152,040, Liu et al., dated Apr. 8, 2013.
Office Action in U.S. Appl. No. 13/034,409, Liu et al., dated May 16, 2013.

\* cited by examiner

METHOD AND APPARATUS FOR DETERMINING CHANNEL BANDWIDTH

CROSS-REFERENCES TO RELATED APPLICATION

This disclosure claims the benefit of the following U.S. Provisional Patent Applications:

U.S. Provisional Patent Application No. 61/354,021, entitled "Multi-Channel NAV Assertion," filed Jun. 11, 2010;

U.S. Provisional Patent Application No. 61/362,238, entitled "Multiple Channel Access," filed Jul. 7, 2010;

U.S. Provisional Patent Application No. 61/380,911, entitled "Multi-Channel NAV Assertion," filed Sep. 8, 2010;

U.S. Provisional Patent Application No. 61/389,631, entitled "VHT Wide BW Indication," filed Oct. 4, 2010;

U.S. Provisional Patent Application No. 61/390,978, entitled "VHT Wide BW Indication," filed Oct. 7, 2010;

U.S. Provisional Patent Application No. 61/407,269, entitled "VHT Wide BW Indication," filed Oct. 27, 2010;

U.S. Provisional Patent Application No. 61/409,812, entitled "VHT Wide BW Indication," filed Nov. 3, 2010;

U.S. Provisional Patent Application No. 61/412,361, entitled "VHT Wide BW Indication," filed Nov. 10, 2010; and U.S. Provisional Patent Application No. 61/415,778, entitled "VHT Wide BW Indication," filed Nov. 19, 2010.

This disclosure is related to U.S. patent application Ser. No. 13/034,409, filed Feb. 24, 2011 (the '409 Application), and to U.S. patent application Ser. No. 13/034,421, filed Feb. 24, 2011.

The present application is also related to U.S. patent application Ser. No. 13/152,040, entitled "Methods and Apparatus for Determining a Composite Communication Channel," filed on the same day as the present application.

The disclosures of all of the above-referenced patent applications are hereby incorporated by reference herein in their entireties.

FIELD OF TECHNOLOGY

The present disclosure relates generally to OFDM-based communication systems and, more particularly, to detection of channel bandwidth of a communication channel.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In an embodiment, a method implemented in a communication device comprises generating a control frame having a bandwidth. The method also comprises causing the control frame to be transmitted via a first composite communication channel having the bandwidth of the control frame, wherein the first composite communication channel comprises a plurality of communication channels. Additionally, the method comprises determining a bandwidth of a response frame received from a second communication device in response to transmitting the control frame. Further, the method comprises determining a second composite communication channel based on the bandwidth of the response frame, wherein the second composite communication channel comprises at least one communication channel from the plurality of communication channels. Still further, the method comprises causing one or more data frames to be transmitted to the second communication device via the second composite communication channel. In another embodiment, a communication device comprises a network interface configured to perform the acts of the method described above.

In yet another embodiment, a method implemented in a communication device comprises receiving a control frame having a bandwidth, the control frame having been transmitted via a first composite communication channel having the bandwidth of the control frame, wherein the first composite communication channel comprises a plurality of communication channels. The method also comprises determining a set of communication channels of the plurality of communication channels in which the control frame was received. Additionally, the method comprises determining a second composite communication channel based on the determination of the set of communication channels in which the control frame was received. Further, the method comprises generating a response frame that indicates the second composite communication channel. Still further, the method comprises causing the response frame to be transmitted, in response to the control frame. In still another embodiment, a communication device comprises a network interface configured to perform the acts of the method described above.

DETAILED DESCRIPTION

Figure 1:
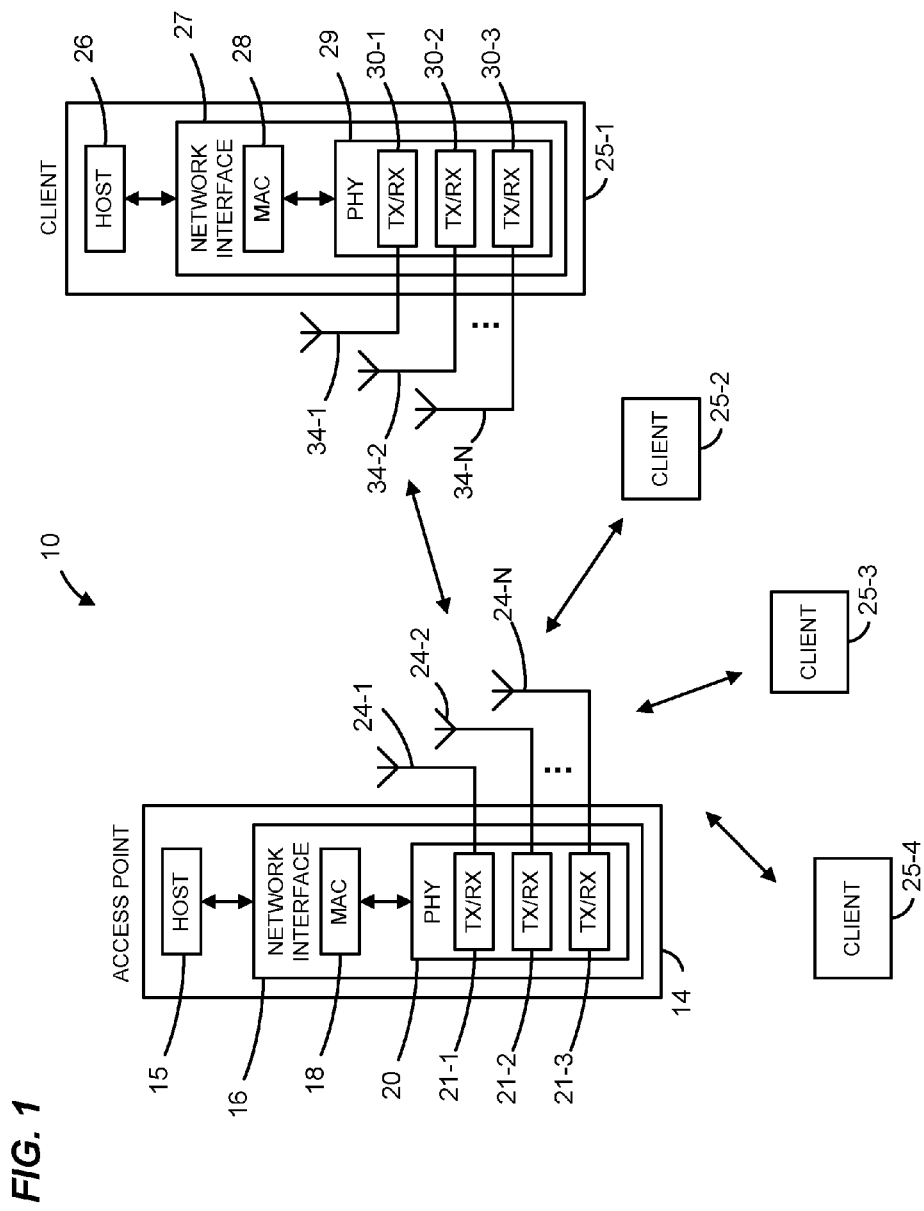
FIG. 1 is a block diagram of an example wireless local area network (WLAN) communication system in which network devices detect bandwidth of the communication channel based on data frames received via a communication channel, according to an embodiment.

In embodiments described below, a first communication device, such as an access point (AP) of a wireless local area network (WLAN), transmits a data stream to a second communication device, such as a client station, via a composite channel formed using one or more communication channels. The communication channels have a bandwidth of 20 MHz, 40 MHz, 80 MHz, 120 MHz, 160 MHz, or other suitable bandwidths. In some embodiments described below, each communication channel in a composite channel has same or similar bandwidths. In other embodiments, the communication channels in a composite channel have different bandwidths.

In an embodiment having a primary channel, a secondary channel, and a tertiary channel, the primary channel and the secondary channel have a same bandwidth, whereas the tertiary channel has a bandwidth larger than the bandwidth of the primary channel (e.g., twice the bandwidth of the primary channel, etc.). In an embodiment, the set of communication channels further includes a quaternary channel having a bandwidth larger than the bandwidth of the tertiary channel (e.g., twice the bandwidth of the tertiary channel, etc.). As an illustrative example, the primary channel has a bandwidth of 20 MHz, the secondary channel has a bandwidth of 20 MHz, the tertiary channel has a bandwidth of 40 MHz, and the quaternary channel has a bandwidth of 80 MHz. As another illustrative example, the primary channel has a bandwidth of 10 MHz, the secondary channel has a bandwidth of 10 MHz, the tertiary channel has a bandwidth of 40 MHz, and the quaternary channel has a bandwidth of 60 MHz.

In other embodiments, the set of communication channels from which a composite channel can be formed includes a primary channel, a secondary channel, a tertiary channel, a quaternary channel, and a quinary channel. In an embodiment, at least some of the primary channel, the secondary channel, the tertiary channel, the quaternary channel, and the quinary channel have different bandwidths. In an embodiment, the tertiary channel, the quaternary channel, and the quinary channel have the same bandwidth. As an illustrative example, the primary channel has a bandwidth of 20 MHz, the secondary channel has a bandwidth of 20 MHz, the tertiary channel has a bandwidth of 40 MHz, the quaternary channel has a bandwidth of 40 MHz, and the quinary channel has a bandwidth of 40 MHz.

In other embodiments, channels in the set of communication channels have suitable bandwidths different than those discussed above. In an embodiment having a primary channel, a secondary channel, and a tertiary channel, for example, the primary channel, the secondary channel, and the tertiary channel have different bandwidths.

Thus, in some embodiments, the composite channel is formed using channels having different bandwidths, at least under some channel conditions.

On the other hand, in other embodiments having a primary channel, a secondary channel, and a tertiary channel, the primary channel, the secondary channel, and the tertiary channel all have the same bandwidth. Thus, in some embodiments, the composite channel is formed using communication channels having the same bandwidth.

In some embodiments, the first communication device determines the composite communication channel based on the status (e.g., busy or idle) of a set of communication channels including at least three communication subchannels. Generally, if a communication channel is idle, the communication channel can be used to form the composite communication channel. In one scenario, a communication device determines that a communication channel is busy based on whether the communication device detects radio frequency (RF) energy in the channel beyond a threshold energy level. In another scenario, a communication device determines that a communication channel is busy (i.e., not idle) based on whether the communication device receives an indication from a second communication device reserving the communication channel for a fixed time duration.

In some scenarios described below, some or all of the communication channels used to form a composite communication channel by a first communication device are busy (i.e., not idle) from the standpoint of a second communication device. In these scenarios, a data stream transmitted by the first communication device to the second communication device via the composite communication channel will not be received by the second communication device in the form that the data stream was transmitted by the first communication device.

In scenarios described above, it may be useful for the first communication device to determine which communication channels in the set of communication channels determined to be idle (i.e., not busy) at the first communication device are also idle (i.e., not busy) from the standpoint of the second communication device. The first communication device "probes the medium around" the second communication device to make the determination, in some embodiments. Based on the results of probing the medium around the second communication device, a composite communication channel is formed wherein the composite communication channel comprises communication channels determined to be idle from the standpoint of both the first and second communication devices.

In embodiments described below, the first communication device probes the medium around the second communication device based on transmitting a data frame to the second communication device via each of the communication channels in the composite communication channel determined to be idle (i.e., not busy) from the standpoint of the first communication device. In one scenario, the data frame is received at the second communication device via some of the communication channels of the composite communication channel. In embodiments described below, the second communication device determines via which communication channels the data frame was received. These subchannels are indicated to be idle from the standpoint of the second communication device, in some embodiments. In an embodiment, the second communication device determines which of the communication channels are busy (i.e., not idle). In some embodiments, the data frame transmitted by the first communication device includes information that indicates the channels in which the data frame was transmitted. In an embodiment, the second communication decodes at least a portion of the data frame (e.g., a header or a portion of the header in a primary channel) to obtain the information that indicates the channels in which the data frame was transmitted and uses this information to determine the channels in which the data frame was received by the second communication device.

In an embodiment, the second communication device includes a plurality of decoders to decode at least a portion of the data frame (e.g., a header or a portion of the header in a primary channel) repeated in a plurality of bandwidth portions of the composite channel. In this embodiment, the second communication device determines in which bandwidth portions the plurality of decoders were able to decode the at least the portion of the data frame. In this embodiment, the second communication device determines the channels that are idle, from the standpoint of the second communication device, based which of the bandwidth portions the plurality of decoders were able to decode the at least the portion of the data frame.

The second communication device transmits a response data frame via the communication channels that the second communication device determined are idle, in some embodiments. The first communication device receives the response data frame via the communication channels in the composite communication channels that were determined to be idle (i.e., not busy) by the second communication device. In these embodiments, the first communication device transmits a data stream to the second communication device via a composite communication channel formed from communication subchannels determined to be idle at both the first and second communication devices.

In some embodiments described below, a first communication device transmits a data frame via each one of the communications channels in the composite channel wherein the data frame includes an indication of the communication channels via which the data frame is being transmitted. In an embodiment, at least a portion of the data frame (e.g., a header or a portion of the header in a primary channel) is repeated in a plurality of bandwidth portions of the composite channel. In some embodiments, a second communication device receives the data frame via some of the communication channels. In these embodiments, the second communication device decodes the at least the portion of the data frame in one of the bandwidth portions in the plurality of bandwidth portions of the composite channel. The second communication device then uses the indication of the communication channels via which the data frame was transmitted to determine the communication channels via which the data frame was received. The second communication device determines the status of the communication subchannels indicated in the data frame using methods such as described below. The second communication device transmits a response data frame via a composite channel that includes each one of the communication channels determined to be idle by the second communication device, in these embodiments. In an embodiment, the data frame includes an indication of the communication channels via which the data frame is being transmitted. The first communication device receives the response data frame and determines, based on the response frame, communication channels that are idle from both the standpoint of the first communication device and the standpoint of the second communication device. In an embodiment, the first communication device transmits a data stream to the second communication device via a composite channel formed from the communication channels determined to be idle at both the first and second communication devices.

In other embodiments, a response data frame transmitted via communication channels determined to be idle by the second communication device includes an indication of the communication subchannels via which the response data frame is transmitted. In these embodiments, the first communication device receives the response data frame and decodes the response data frame. The first communication device retrieves the indication of the communication channels via which the response data frame was transmitted. In an embodiment, the first communication device uses the indication of the communication channels via which the response frame was transmitted to determine communication channels that are idle from both the standpoint of the first communication device and the standpoint of the second communication device. In an embodiment, the first communication device transmits a data stream to the second communication device via a composite channel formed from the communication channels in the composite communication channel based on the indication in the response data frame.

In some embodiments, it is useful to reform the composite communication channel during a transmit opportunity period of the first communication device. In these embodiments, a first communication device probes the medium of the second communication device not only preceding or at the beginning of the transmission opportunity of the first communication device but also during the transmission opportunity of the first communication device (e.g., after transmitting one or more data units via the composite channel). In an embodiment, the first communication device probes the medium of a communication device other than the second communication device during the transmission opportunity of the first communication device (e.g., after transmitting one or more data units via the composite channel). In some of these embodiments, a data frame used to probe the medium between the transmission of the data stream is transmitted via the composite communication channel (or via a different composite channel that has a wider or narrower bandwidth) during the transmission opportunity of the first communication device. The first communication device analyzes a response frame from the second communication device (or a different communication device) to determine communication channels that are idle from both the standpoint of the first communication device and the standpoint of the second (or other) communication device. The first communication device changes the composition of the composite channel (e.g., adds or subtracts channels) when appropriate based on the analysis of the response frame, in an embodiment.

In other embodiments, a first communication device probes the medium around several other communication devices. This is useful in a scenario when a single data stream is intended to be received by the several other communication devices, for example multiuser, multicast or broadcast data streams.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 and the number of transceivers 21 need not be the same as the number of antennas 24, in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 and the number of transceivers 30 need not be the same as the number of antennas, in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas.

In an embodiment, the network interface 16 of the AP 14 is configured to form a composite channel including one or more communications channels, and to transmit a data frame to one or more client devices 25 via the composite channel. In an embodiment, the data frame is received at one or more client devices 25. The network interface 29 of the client device 25-1, for example, determines via which communication channels the data frame was received. These channels are denoted by the network interface 29 as idle from the standpoint of the client device 25-1, in an embodiment. The network interface 29 is configured to transmit a response frame to the AP 14 using a composite channel that includes the communication channels denoted by the network interface 29 as idle. The network interface 16 of the AP 14 is configured analyze the response frame to determine a set of one or more communication channels that are idle from the standpoint of both the AP 14 and the client device 25-1, in an embodiment. The network interface 16 is configure to form a composite channel including one or more communications channels that are idle from the standpoint of both the AP 14 and the client device 25-1, and to transmit one or more data frames to the client device 25-1 via the composite channel.

Figure 2:
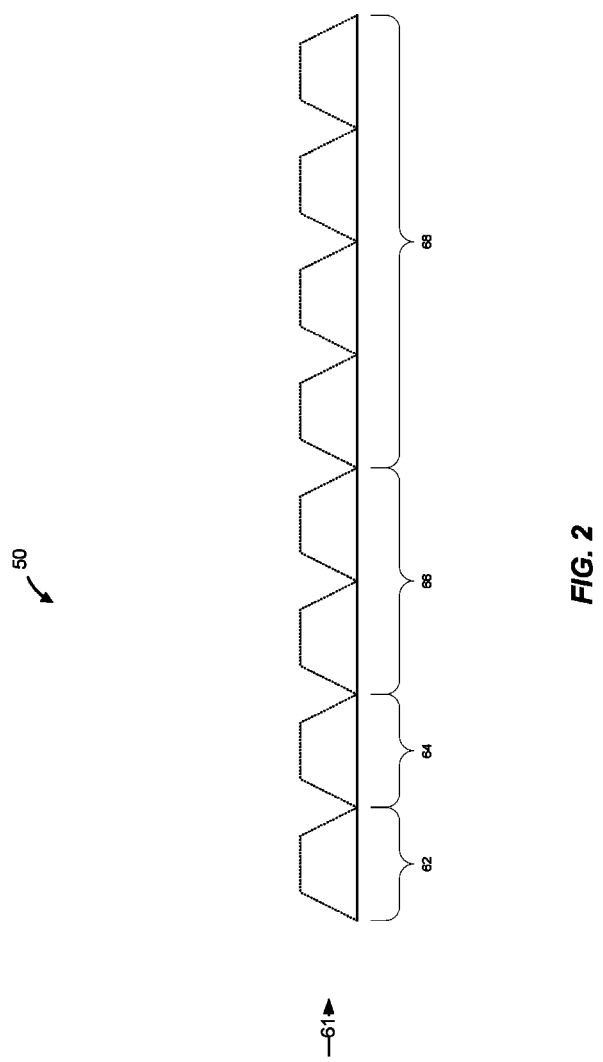
FIG. 2 is an example of a composite communication channel formed using bandwidth detection techniques, in an embodiment.

FIG. 2 is an illustrative example of a composite communication channel 50 formed by an AP 14 using techniques described below, in an embodiment. In this embodiment, composite communication channel 50 comprises bandwidth portions 61. The bandwidth portions 61 have the same bandwidth. In other embodiments, at least some bandwidth portions have different bandwidths. The composite communication channel 50 comprises a primary communication channel 62, a secondary communication channel 64, a tertiary communication channel 66, and a quaternary communication channel 68. Each of the channels 62, 64, 66, and 68 are comprised of one or more bandwidth portions 61. In other scenarios, the composite channel includes fewer channels. In other embodiments and/or scenarios, the composite channel includes an additional one or more channels, such as a quinary channel. In other embodiments, each communication channel in the composite channel has the same bandwidth.

Referring to FIG. 1, in an embodiment, the operation of AP 14 and the client stations 25-1, 25-2 and 25-3 conforms to the IEEE 802.11ac Standard (now in the process of being finalized) based communication protocol or another suitable protocol. In this embodiment, the AP 14 is configured to transmit data frames to client station 25-1 via a wide bandwidth (e.g., 80 MHz or another suitable bandwidth) composite communication channel when appropriate (e.g., when the channel bandwidth is available (e.g., not busy) and when client devices 25 are capable of receiving via the wide bandwidth). In an embodiment, the composite communication channel (e.g., 80 MHz wide, 120 MHz, 160 MHz, or another suitable bandwidth) comprises a plurality of communication channels (e.g., a primary communication channel having a first bandwidth portion (e.g., 20 MHz wide), a secondary communication channel having a second bandwidth portion (e.g., 20 MHz wide), a tertiary communication channel having a third bandwidth portion (e.g., 40 MHz wide), etc.).

In an embodiment, one of the client devices (e.g., client device 25-4) is a legacy client device. The legacy client device 25-4 is configured to operate according to a different protocol (e.g., the IEEE 802.11a Standard based communication protocol, the IEEE 802.11g Standard based communication protocol, the IEEE 802.11n Standard based communication protocol or another suitable protocol), in an embodiment. The AP 14 is configured also to transmit and receive according to the different protocol, and transmits a data stream to the legacy client station 25-4 via the primary channel (e.g., a 20 MHz wide communication channel), in an embodiment.

In one embodiment, an AP 14 determines that a plurality of communication channels (e.g., two or more of the primary, the secondary channel, and the tertiary channel) are idle. In this embodiment, the AP 14 makes this determination by employing one or both of carrier sense media access (CSMA) and clear channel assessment (CCA) techniques. Example techniques for determining whether communication channels are idle and for forming a composite channel are described in the '409 Application. In other embodiments, other suitable techniques for determining whether communication channels are idle and for forming a composite channel are utilized.

In an embodiment, before or at the beginning of a transmit opportunity of the AP 14, the AP 14 probes the medium at the client 25-1 to determine which channels are idle from the standpoint of the client 25-1. To probe the medium at the client device 25-1, the AP 14 transmits a control data frame (e.g., Request-to-Send (RTS)) via a composite channel. At least a portion of the RTS frame (e.g., a header or a portion of the header) is duplicated in each of a plurality of bandwidth portions in the composite channel, in an embodiment. For example, in an embodiment in the primary channel has a bandwidth of 20 MHz, at least a portion of the RTS frame (e.g., a header or a portion of the header) is duplicated in each of a plurality of 20 MHz bandwidth portions in the composite channel, in an embodiment.

In an embodiment, the client 25-1 receives the control data frame (e.g., RTS) transmitted by the AP 14. In some scenarios, the client device 25-1 does not receive the control data frame in all of the channels in which the AP 14 transmitted the control data frame. In an embodiment, the client 25-1 determines the communication channels in which the client 25-1 received the control data frame and determines channels that are idle from the standpoint of the client device 25-1 based on the communication channels in which the client 25-1 received the control data frame. In an embodiment, the client 25-1 transmits a clear-to-send (CTS) control data frame via those communication channels that the client 25-1 determined are idle. In this embodiment, the AP 14 receives the CTS control data frame received via one or more communication channels and determines the channels that are idle from the standpoint of the client device 25-1 based on the communication channels via which the CTS control data frame was received. The AP 14 then transmits, during a transmit opportunity period (TXOP) of the AP 14, one or more data units to the client 25-1 via a composite communication channel formed from the communication channels via which the CTS data frame was received. In an embodiment, a TXOP is a bounded time interval reserved for a communication device in a network during which the communication device can send as many frames as possible (as long as the duration of the transmissions does not extend beyond the TXOP). In an embodiment, other communication devices are generally not permitted to transmit in the TXOP unless the communication device that owns the TXOP specifically permits the other communication device to transmit or unless the other communication device is acknowledging a transmission of the communication device that owns the TXOP.

By way of example and without any limitation, in embodiments described below, RTS and CTS control data frames are utilized and analyzed to determine available channels for a composite communication channel. In other embodiments, other suitable control data frames are utilized, such as control data frames according to the IEEE 802.11 a/g/n/ac Standard such as Sounding frames. In other embodiments, regular data frames (e.g., non-control data frames) can be analyzed to determine available channels for a composite channel.

FIGS. 3A-3D are timing diagrams corresponding to illustrative examples for an embodiment in which a client 25-1 decodes data frames received via a composite communication channel that includes a primary communication channel and a secondary communication channel. FIGS. 3A-D illustrate the secondary channel and omit the primary channel for clarity.

Figure 3A:
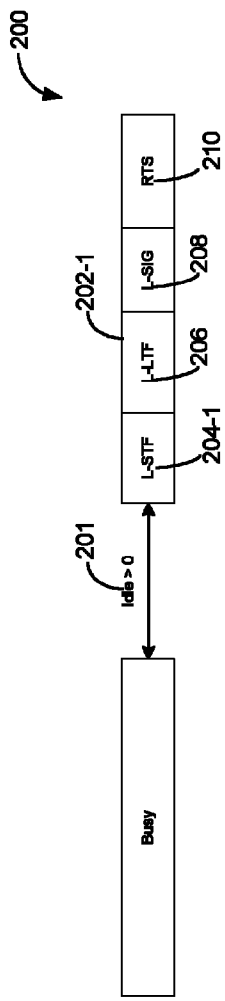
FIGS. 3A-3D are illustrations of example timing diagrams corresponding to a client station decoding data frames received via a composite communication channel.

FIG. 3A is a timing diagram for an example when the secondary communication channel 200 is idle for a non-zero time period 201 before an RTS data frame 202-1 is received and decoded at the client 25-1. In the IEEE 802.11a/g/n/ac Standards, a data frame begins in time with a preamble. The preamble comprises a legacy-short training field (L-STF) 204, a legacy-long training field (L-LTF) 206 and a legacy-signal field (L-SIG) 208, in an embodiment. The L-STF 204-1 is a periodic signal having a periodicity of 0.8 microseconds and a duration of 8 microseconds, in an embodiment. In an embodiment, the client device 25-1 includes a carrier sense (CS) unit with an autocorrelator and detects the L-STF 204-1 in the primary channel based on an output of the autocorrelator. For example, an autocorrelation of the received signal will indicate the periodicity of 0.8 microseconds for a time period slightly shorter than the duration (e.g., 8 microseconds) of the L-STF 204-1.

In an embodiment, the client device 25-1 includes a clear channel assessment (CCA) unit with an energy detector and detects energy in the secondary channel (e.g., detects when the energy exceeds a suitable threshold).

In an embodiment, a client 25-1 determines that a data frame transmitted in the primary channel is also transmitted in a secondary channel if the secondary channel is determined to be idle for a defined period of time (such as the short interframe space (SIFS), the arbitration interframe space (AIFS), the point coordination function (PCF) interframe space (PIFS), or the distributed coordination function (DCF) interframe space (DIFS) described in the IEEE 802.11 Standard) prior to the L-STF 204-1 being detected in the primary channel. For example, in some embodiments, the client 25-1 does not include a second autocorrelator to detect the L-STF 204-1 in the secondary channel at the same time as another autocorrelator detects the L-STF 204-1 in the primary channel.

In an embodiment, when the CS unit detects the L-STF 204-1 in the primary channel, it is determined whether the CCA unit detects energy in the secondary channel at a time corresponding to the start of the L-STF 204-1 in the primary channel. This indicates that the data frame transmitted in the primary channel is also being transmitted in the secondary channel, in an embodiment. In another embodiment, when the CS unit detects the L-STF 204-1 in the primary channel, it is additionally or alternatively determined whether a second autocorrelator detects the L-STF 204-1 in the secondary channel at a time corresponding to the start of the L-STF 204-1 in the primary channel. In this embodiment, detecting the L-STF 204-1 in the secondary channel at a time corresponding to the start of the L-STF 204-1 in the primary channel indicates that the data frame transmitted in the primary channel is also being transmitted in the secondary channel. Additionally or alternatively, the client device 25-1 determines whether, prior to the start of the L-STF 204-1 in the primary channel, energy in the secondary channel was below a threshold for a defined period of time (such as the short interframe space (SIFS), the arbitration interframe space (AIFS), the point coordination function (PCF) interframe space (PIFS), or the distributed coordination function (DCF) interframe space (DIFS) described in the IEEE 802.11 Standard). It is determined that the secondary channel is idle based on the CCA unit detecting energy in the secondary channel and/or a second autocorrelator detecting the L-STF 204-1 in the secondary channel at a time corresponding to the start of the L-STF 204-1 in the primary channel and/or, prior to the start of the L-STF 204-1 in the primary channel, energy in the secondary channel was below a threshold for the defined period of time. In another embodiment, it is determined that the secondary channel is idle based on the CCA unit detecting energy in the secondary channel and/or a second autocorrelator detecting the L-STF 204-1 in the secondary channel at a time corresponding to the start of the L-STF 204-1 in the primary channel and/or, prior to the start of the L-STF 204-1 in the primary channel, energy in the secondary channel was below a threshold for a non-zero period of time.

Thus, in the scenario of FIG. 3A, it is determined that the secondary channel is idle from the standpoint of the client device 25-1. In this example, the client device 25-1 transmits a CTS response data frame when the client device 25-1 decodes the payload 210 of the RTS control data frame 202-1.

Figure 3B:
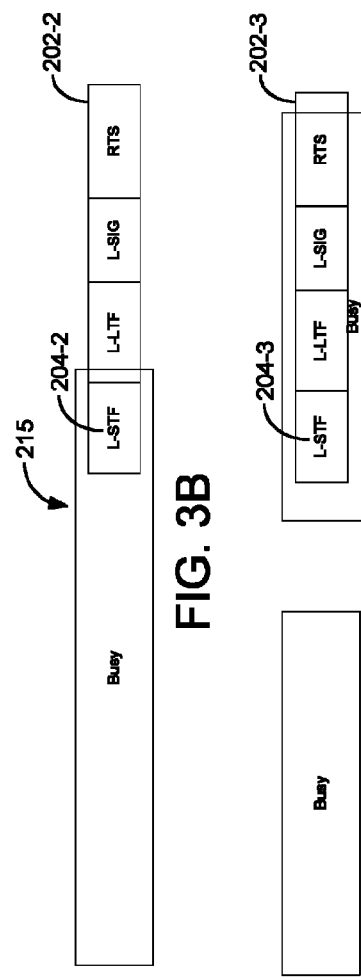
Figure 3C:
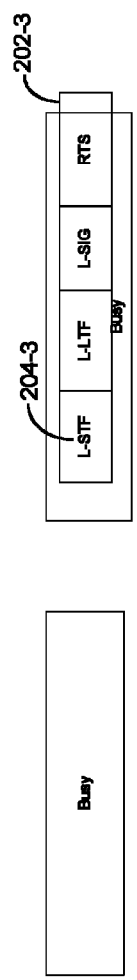
Figure 3D:
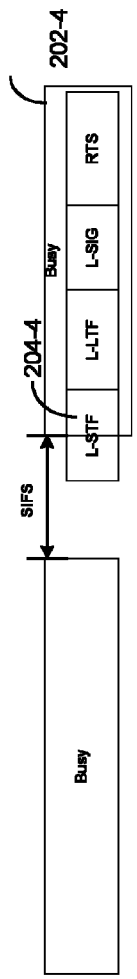

FIGS. 3B-3D are timing diagram for example scenarios where the secondary composite channel 200 is busy, from the standpoint of the client device 25-1, for a portion of an RTS data frame 202-2 . . . 220-4 received via a communication channel comprising at least the primary channel and the secondary channel. In each of the examples of FIGS. 3B-D, the client 25-1 does not transmit a CTS data frame to the AP 14 via the secondary channel 200 in response to receiving the data frames 202-2 . . . 202-4. In these examples, the AP 14 forms a composite communication channel which does not include the secondary channel 200 (e.g., the composite channel is limited to the primary channel). Thus, even though the secondary channel 200 was idle from the standpoint of the AP 14, the AP 14 determines that the secondary channel 200 is busy from the standpoint of the client device 25-1 and thus does not utilize the secondary channel 200 in the composite channel.

Referring to FIG. 3B, the secondary channel 200 is busy or reserved by another communication device, from the standpoint of the client device 25-1, for a non-zero time period overlapping the reception of a data frame 202-2. The client device 25-1 determines that, prior to the start of the L-STF 204-2 in the secondary channel, energy in the secondary channel was not below the threshold for the defined period of time. In this example, the client device 25-1 does not transmit a CTS response data frame via the secondary channel.

Similarly, in the example scenario illustrated in FIG. 3C, the secondary channel 200 is busy or reserved by another communication device, from the standpoint of the client device 25-1, upon reception of a RTS data frame 202-2, 202-3 via the secondary channel 200. The client device 25-1 determines that, prior to the start of the L-STF 204-3 in the secondary channel, energy in the secondary channel was not below the threshold for the defined period of time. In this example, the client device 25-1 does not transmit a CTS response data frame via the secondary channel.

Similarly, in the example scenario illustrated in FIG. 3D, the secondary channel 200 is busy or reserved by another communication device, from the standpoint of the client device 25-1, prior to reception of a RTS data frame 202-4 via the secondary channel 200. The client device 25-1 determines that, prior to the start of the L-STF 204-3 in the secondary channel, energy in the secondary channel was not below the threshold for the defined period of time. In this example, the client device 25-1 does not transmit a CTS response data frame via the secondary channel.

In other embodiments, the client device 25-1 detects the L-STF of an RTS in a channel other than the primary channel. The client device 25-1 then determines whether one or more other channels, including the primary channel in an embodiment, are idle from the standpoint of the client device 25-1 based on the detection of the L-STF of the RTS in a manner similar to the techniques discussed above.

In some embodiments, a communication device (for example AP 14, client 25-1) has a single decoder. In these embodiments, the client device 25-1 decodes an RTS control data frame received via a primary channel (or another suitable channel). In these embodiments, the client device 25-1 utilizes techniques described above to determine the bandwidth of the composite communication channel without decoding the RTS control data frame in all of the channels of the composite channel.

In the embodiments described above, a client 25-1 employs one or several example techniques in the PHY processing unit 29 to determine in which communication channels an RTS control data frame was received. In some embodiments, the client 25-1 transmits a clear-to-send (CTS) response via communication channels via which the RTS control data frame was detected and that were otherwise idle. For example, in some embodiments, a PHY processing unit 29 determines that an RTS control data frame was received via one or more non-decoded communication channels based on whether each channel was idle during a defined time duration before an estimated start of the RTS control data frame.

As discussed above, in some embodiments, a client 25-1 employs CCA techniques to determine if an RTS control data frame transmitted by the AP 14 is received via the communication channels which are not capable of being decoded simultaneously with decoding the primary channel (or another suitable channel via which the RTS control frame is received). As discussed above, CCA includes measuring the energy (energy detect) received via communication channels in the composite channel (such as the secondary and tertiary channels), and comparing the energy levels to a suitable threshold (e.g. −62 dBm or another suitable threshold) to detect if a communication channel is busy or idle. The PHY processing unit 29 maintains a history of the energy levels measured in each of a plurality of communication channels, for example, in an embodiment. By determining when the energy level of a communication channel transitions from idle to busy, relative to the detection of an RTS data frame received via the primary channel, for example, and for how long the channel was idle previous to the transition from idle to busy, a client 25-1 determines if communication channels not corresponding to the primary channel, for example, are busy because of receiving the RTS control data frame (but was idle sufficiently before the RTS). In this embodiment, the client 25-1 transmits a CTS data frame via the primary channel and the zero, one or more communication channels in which an RTS data frame was indicated to have been detected (and was idle sufficiently before the RTS).

As discussed above, in some embodiments, the PHY processing unit 29 whether a channel was idle for at least a defined time period prior to a transition from idle to busy that corresponds to the start of the RTS control data frame. In an embodiment, the defined time period corresponds to SIFS. In another embodiment, the defined time period corresponds to PIFS. In other embodiments, another suitable time period is utilized. In these embodiments, if the channel is not idle for at least the defined time period, the client device 25-1 determines that the channel is busy not because of receiving an RTS data frame. In this scenario, client 25-1 determines that the composite communication does not include the communication channel that was determined to be busy for reasons other than receiving the RTS control data frame. The client 25-1 transmits a CTS response data frame via a composite channel that does not include the communication channel determined to be busy for reasons other than receiving the RTS control data frame.

Figure 4:
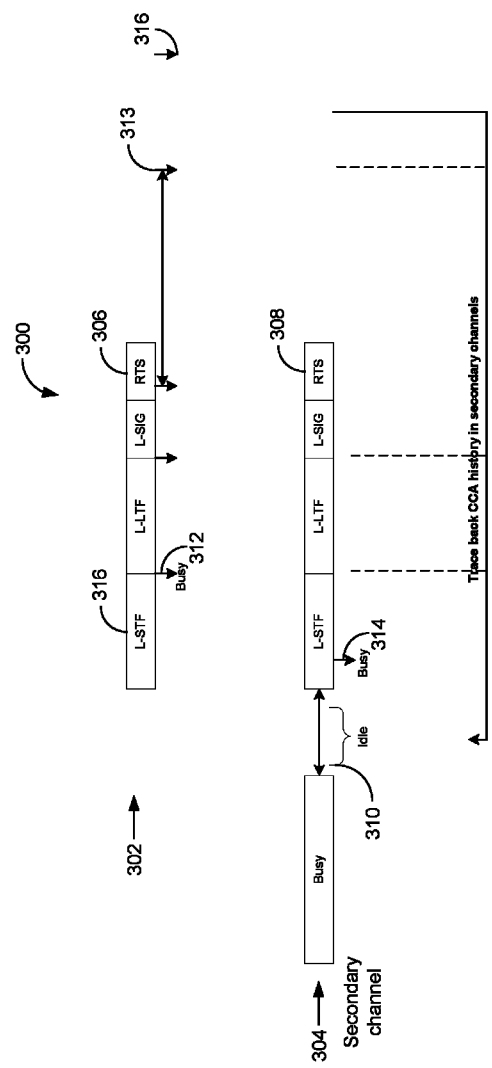
FIG. 4 is a timing diagram of a method used to detect the bandwidth of a communication channel in an embodiment.

FIG. 4 is a timing diagram corresponding to an illustrative example for an embodiment in which a client 25-1 determines which channels of a composite communication channel 300 are idle from the standpoint of the client device 25-1. In this example the composite communication channel from the standpoint of the AP 14 comprises a primary channel 302 and a secondary channel 304. Each of these channels comprises a single bandwidth portion, in this example. In an embodiment, when an RTS control data frame 306 is detected in the primary communication channel 302, the client 25-1 uses CCA to determine if the secondary communication channel 304 is busy due to the reception of a corresponding RTS control data frame 308 via the secondary communication channel 304 (but was idle sufficiently before the RTS).

A CCA processor in the PHY processing unit 29 of client 25-1 determines that the secondary communication channel 304 is idle starting at time 310, in an embodiment. At time 312, the CCA processor of PHY processing unit 29 determines that the primary communication channel 302 is busy. At time 313, the PHY processing unit 29 decodes the received data frame 306 and determines that the data frame 306 is an RTS data frame. At time 314, the CCA processor in the PHY processing unit 29 determines that the secondary communication channel 304 is busy. At time 316, the CCA processor in PHY processing unit 29 determines that the secondary communication channel was not busy (i.e., idle) before the RTS was received. In one embodiment, client 25-1 determines that secondary communication channel 304 was idle at the start of the reception of the RTS data frame 306. In this embodiment, client 25-1 determines that the secondary channel went busy at time 314 because data frame 308 corresponds to a RTS data frame corresponding to the RTS data frame 306. The client 25-1 determines whether the secondary channel was idle for at least the defined time period prior to the start of the L-STF. In this embodiment, client 25-1 determines that the composite communication channel 300 comprises the primary communication channel 302 and the secondary communication channel 304.

In another embodiment, a client 25-1 employs preamble detection techniques (e.g., carrier sense (CS)) to determine if an RTS data frame transmitted by AP 14 is received via the communication channels which are not capable of being decoded. Preamble detection includes detecting the presence of an L-STF and/or an L-LTF corresponding to a preamble of a data frame received via a communication channel. In an embodiment, the PHY processing unit 29 of client 25-1 includes a CS unit having an autocorrelator. The autocorrelator generates and indication of the L-STF, which is a periodic signal having a periodicity of 0.8 microseconds and a duration of 8 microseconds, in an embodiment. In an embodiment, the PHY processing unit 29 maintains a history of the energy levels measured in each of the communication subchannels corresponding to the secondary and tertiary channels. By analyzing the temporal relationship between the detection of preambles in communication channels corresponding to non-primary communication channels relative to a change in energy level based on CCA, when an RTS data frame is decoded in a primary communication channel, the client 25-1 determines the bandwidth of the composite communication channel formed by an AP 14 based on CS information generated by the CS unit, in this embodiment. In these embodiments, a CCA threshold corresponding to −82 dBm is used to detect the transition of a communication from busy (greater than '82 dBm) to idle (less than or equal to −82 dBm) and vice versa when CS unit indicates the L-STF has been detected.

In other embodiments, a PHY processing unit 29 of client 25-1 decodes a plurality of bandwidth portions in a composite communication channel. In these embodiments, a first decoder in PHY processing unit 29 decodes a data frame received via a communication channel corresponding to a primary communication channel. The PHY processing unit 29 includes a preamble detection processor capable of detecting a preamble in each of the communication channels corresponding to the composite communication channel. In one of these embodiments, a preamble detection processor comprises an autocorrelator. In this embodiment, on determining that an RTS data frame was received via a communication channel corresponding to the primary communication channel, the client 25-1 analyzes the output of the preamble detection processor to determine if a preamble was detected in each of the other non-primary communication channels comprising the composite communication channel. In this embodiment, a second decoder in PHY processing unit 29 decodes a data frame received via one of the several non-primary communication channels for which a preamble was detected to determine if the data frame corresponds to an RTS data frame. Based on the result of the second decoder, client 25-1 determines the bandwidth of the composite communication channel formed by an AP 14.

Figure 5A:
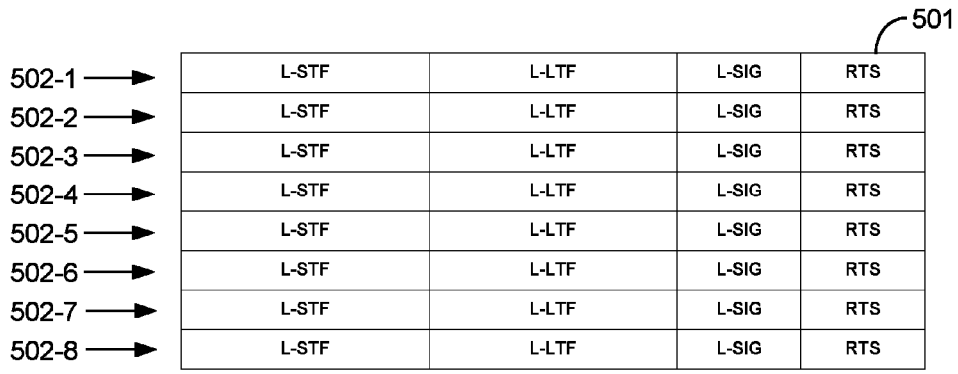
FIG. 5A is an illustration of a communication channel via which a communication device receives data frames used to detect the bandwidth of a communication channel in an embodiment.
Figure 5B:
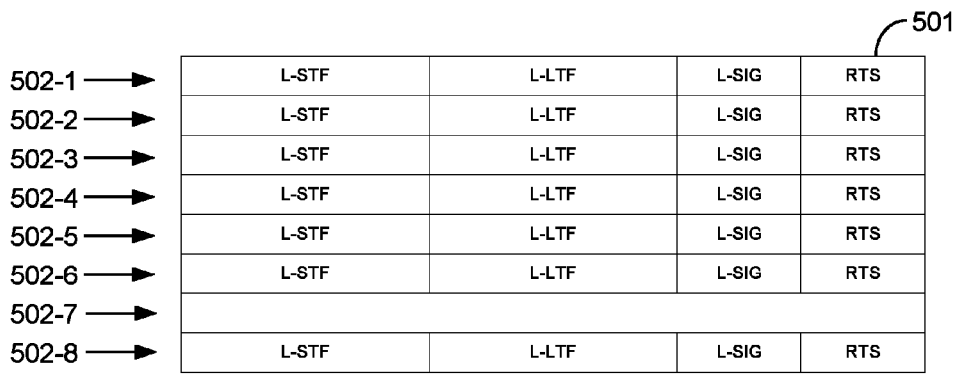
FIG. 5B is yet another illustration of a communication channel via which a communication device receives data frames used to detect the bandwidth of a communication channel in an embodiment.
Figure 5C:
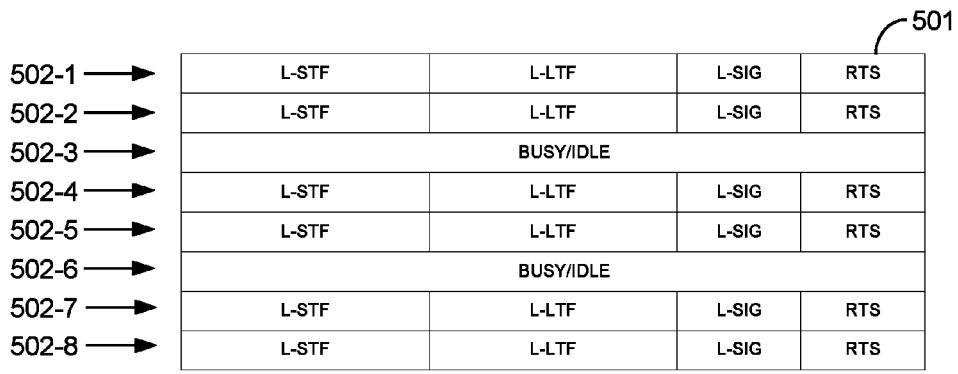
FIG. 5C is still another illustration of a communication channel via which a communication device receives data frames used to detect the bandwidth of a communication channel in an embodiment.

FIGS. 5A-5C are illustrative examples of a composite communication channel 500 via which an AP 14 transmits an RTS to a client 25-1. In these examples, composite communication channel 500 is formed from primary, secondary, tertiary and quaternary communication channels. Each of these channels comprise one or more bandwidth portions 502-1 . . . 502-8, each having the same bandwidth. In these examples communication channel 502-1 corresponds to the primary channel, 502-2 corresponds to the secondary channel, 502-3 and 502-4 corresponds to the tertiary channel and 502-5 . . . 502-8 corresponds to the quaternary channel.

In an embodiment, a decoder in client 25-1 decodes a control data frame (e.g., RTS) transmitted by the AP 14 in the composite channel 500 and received by the client device 25-1 at least via the primary channel 502-1, in the examples of FIGS. 5A-C. In an embodiment, the decoder in the client device 25-1 decodes the primary channel 502-1 and determines that the received data frame is an RTS control frame.

Referring to FIG. 5A, based on techniques described above, the PHY processing unit 29 of the client 25-1 determines that preambles were detected in each of the bandwidth portions 502-2 . . . 502-8 and/or that CCA indicates that the secondary, tertiary, and quaternary channels were idle for a non-zero time period or at least the defined time period. Based on techniques described above, the client 25-1 determines that the primary, secondary, tertiary, and quaternary channels are idle from the standpoint of the client device 25-1.

Referring to FIG. 5B, based on techniques described above, the PHY processing unit 29 of the client 25-1 determines that preambles were detected in each of the bandwidth portions 502-2 . . . 502-6 and 502-8, but not 502-7, and/or that CCA indicates that the secondary and tertiary channels were idle for a non-zero time period or at least the defined time period. Based on techniques described above, the client 25-1 determines that the primary, secondary, and tertiary channels are idle from the standpoint of the client device 25-1, but not the quaternary channel.

Referring to FIG. 5C, based on techniques described above, the PHY processing unit 29 of the client 25-1 determines that preambles were detected in each of the bandwidth portions 502-2, 502-4, 502-5, 502-7, and 502-8, but not 502-3 and 502-6 and/or CCA indicates that the secondary channel was idle for a non-zero time period or at least the defined time period. Based on techniques described above, the client 25-1 determines that the primary and secondary channels are idle from the standpoint of the client device 25-1, but not the tertiary and quaternary channels.

In an embodiment, the client device 25-1 transmits a clear-to-send (CTS) control data frame via those communication channels that the client 25-1 determined an RTS was received and were idle for a non-zero time period or at least the defined time period prior to the start of the RTS. In an embodiment, the client device 25-1 transmits a clear-to-send (CTS) control data frame via those communication channels that i) the client 25-1 determined an RTS was received, ii) were idle for a non-zero time period or at least the defined time period prior to the start of the RTS, and iii) form a valid composite channel permitted by a communication protocol. For instance, as described in the '409 Application, only some combinations of channels are permissible in forming a composite channel according to an example communication protocol, in some embodiments. Thus, for example, in an embodiment, for a given set of channels, a composite channel is not permitted to partially overlap with a channel. For example, a composite channel consisting of bandwidth portions 502-1 through 502-6 is not permitted due to partial overlap with the quaternary channel, and a composite channel consisting of bandwidth portions 502-1, 502-2, 502-4 and 502-5 is not permitted due to partial overlap with the tertiary channel and the quaternary channel, in an embodiment. In some embodiments, for a given set of channels including a primary channel, a secondary channel, a tertiary channel and a quaternary channel, a composite channel is permitted to include the secondary channel only if the composite channel also includes the primary channel. Similarly, in an embodiment, for a given set of channels including a primary channel, a secondary channel, a tertiary channel and a quaternary channel, a composite channel is permitted to include the tertiary channel only if the composite channel also includes the primary channel and the secondary channel. Similarly, in an embodiment, for a given set of channels including a primary channel, a secondary channel, a tertiary channel and a quaternary channel, a composite channel is permitted to include the quaternary channel only if the composite channel also includes the primary channel, the secondary channel and the tertiary channel.

In an embodiment, the first communication device is not permitted to send an RTS after the first transmitted data unit in a TXOP. In other embodiments, the first communication device is permitted to send one or more RTS frames after the first transmitted data unit in the TXOP. This is useful, for example, if there is more than one receiver in the TXOP, in an embodiment. Also, this is useful, for example, when a data unit transmitted by the first communication device after the first data unit in the TXOP is not acknowledged, in an embodiment. In an embodiment, the bandwidth of the RTS sent after the first transmitted data unit in the TXOP must be less than or equal to the bandwidth of the composite channel determined/utilized at the beginning of the TXOP. In another embodiment, the bandwidth of the RTS sent after the first transmitted data unit in the TXOP is allowed to be greater than the bandwidth of the composite channel determined/utilized at the beginning of the TXOP.

In an embodiment, when transmitting an RTS in the middle of a TXOP (i.e., after the transmission of the first data unit in the TXOP), the first communication device waits at least the defined time period discussed above after the previous transmission before transmitting the RTS. For example, in one embodiment, the defined period discussed above is the PIFS, and the first communication device waits at least PIFS after the previous transmission before transmitting the RTS. In an embodiment, if the RTS is only to be transmitted within the primary channel, the first communication device need not wait at least PIFS after the previous transmission before transmitting the RTS, but only waits at least SIFS.

In an embodiment, when receiving an RTS in the middle of a TXOP (i.e., after the transmission of the first data unit in the TXOP), a receiver does not check whether channels are idle for at least the defined period. For example, if the defined period is PIFS, the receiver check whether channels are idle for at least the SIFS or some other time period which is shorter than PIFS, in an embodiment.

In an embodiment, an RTS transmitted in the middle of a TXOP does not cause receivers to perform the busy/idle status of channels as discussed above. In this embodiment, the RTS transmitted before or at the beginning of the TXOP does cause receivers to determine the busy/idle status of channels as discussed above. In an embodiment, the RTS transmitted before or at the beginning of the TXOP includes an indication (e.g., in a header of the RTS or in the payload) that indicates that receivers are to determine the busy/idle status of channels in response to the RTS as discussed above, and an RTS transmitted in the middle of the TXOP omit the indication. In another embodiment, a receiver determines whether an RTS was transmitted at the beginning or before a TXOP and only determines busy/idle status of channels as discussed above when the RTS was transmitted at the beginning or before a TXOP (i.e., the receiver will not determine busy/idle status of channels as discussed above when the RTS was transmitted after the first data unit of a TXOP). In some embodiments, when an RTS is sent in the middle of a TXOP, the receiver utilizes a technique different than discussed above to determine the available bandwidth from the standpoint of the receiver. For example, in an embodiment, the PHY processing unit 29 generates an indicator of available bandwidth (e.g., similar to the CH_Bandwidth indication specified in the IEEE 802.11n specification), and determining the available bandwidth from the standpoint of the receiver is based on the indicator.

In an embodiment, response frames to an RTS must have a bandwidth less than or equal to the bandwidth of the RTS. In an embodiment, all frames transmitted in a TXOP must have a bandwidth less than or equal to the bandwidth of the first RTS associated with the TXOP. In an embodiment in which multiple RTS's are transmitted during a TXOP, all frames transmitted in a TXOP must have a bandwidth less than or equal to the bandwidth of the most recently transmitted RTS. In an embodiment, all frames transmitted in a TXOP must have a bandwidth less than or equal to the bandwidth of the response frame to the first RTS associated with the TXOP. In an embodiment in which multiple RTS's are transmitted during a TXOP, all frames transmitted in a TXOP must have a bandwidth less than or equal to the bandwidth of the response frame to the most recently transmitted RTS.

In an embodiment, a TXOP holder can truncate a TXOP by transmitting a control frame that indicates the end of the TXOP (e.g., similar to the CF-END frame specified in the IEEE 802.11n Standard). In an embodiment, the control frame that indicates the end of the TXOP is transmitted in the bandwidth available at the current time (which may be different than the initial bandwidth of the TXOP). In an embodiment, the control frame that indicates the end of the TXOP is transmitted in the bandwidth initially available for the TXOP. In an embodiment, if the TXOP holder is a client station 25, the control frame that indicates the end of the TXOP is transmitted in the bandwidth available from the standpoint of the AP 14.

In embodiments described below, a communication device transmits a control data frame (e.g., an RTS, a CTS, etc.) in a composite channel. In some embodiments, the communication device includes an indication in the transmitted control data frame that indicates the bandwidth of the control data frame. In an embodiment, the control data frame comprises a transmission duplicated in each of a plurality of bandwidth portions. Another communication device that receives the control data frame and is able to decode the transmission in one or more of the bandwidth portions utilizes the indication to determine the bandwidth of the control data frame, which indicates the available bandwidth from the standpoint of the device that transmitted the control data frame, in an embodiment.

Based on techniques such as described above i.e., energy detection, preamble detection and/or plural channel decoders, a receiving communication device determines which of the communication channels are idle from the standpoint of the receiving device, in an embodiment.

In an embodiment, the receiving communication device compares the indication of the bandwidth of the control data frame with the results of the determination of which communication channels are idle from the standpoint of the receiving device. Based on the comparison, the receiving communication device forms a composite communication channel comprising channels that are available both from the standpoint of the device that transmitted the control data frame and from the standpoint of the device that received the control data frame. In an embodiment, the receiving communication device transmits a response control data frame (e.g., a CTS) via channels of the composite communication channel that are available both from the standpoint of the device that transmitted the initial control data frame and from the standpoint of the device that received the initial control data frame. The response control data frame includes an indication of the bandwidth of the response control data frame.

Referring to FIG. 1, in some embodiments a first communication device, e.g., AP 14, includes an indication of the bandwidth of the composite communication channel determined to be idle from the standpoint of the first communication device. In an embodiment, the AP 14 operating according to the IEEE 802.11ac Standard or another suitable protocol transmits an indication of the bandwidth of the composite communication channel in a header portion of a control data frame, where the header portion otherwise conforms to one or more legacy protocols such as one or more of the IEEE 802.11 a/g/n Standards. For example, the indication is included in a reserved field of a header portion. In embodiments described below, a communication device utilizes fields in a control data frame (e.g., in a header of the control data frame) to indicate that the control data frame includes bandwidth information to indicate the bandwidth of the control data frame. In some embodiments, the indication of bandwidth is protected with a forward error detection/correction code.

In some embodiments described below, a PHY processing unit 29 of client 25-1 decodes at least a portion of a control data frame received via a bandwidth portion of a composite channel, such as a channel corresponding to the primary communication channel of the composite communication channel. Based on decoding of the at least the portion of the control data frame, the indication of the bandwidth of the composite communication channel is determined. The indication is provided by the PHY processing unit 29 to the MAC processing unit 28 in an embodiment.

In some other embodiments, the MAC processing unit 28 extracts the bandwidth indication from the control data frame decoded by the PHY processing unit 29.

Figure 6:
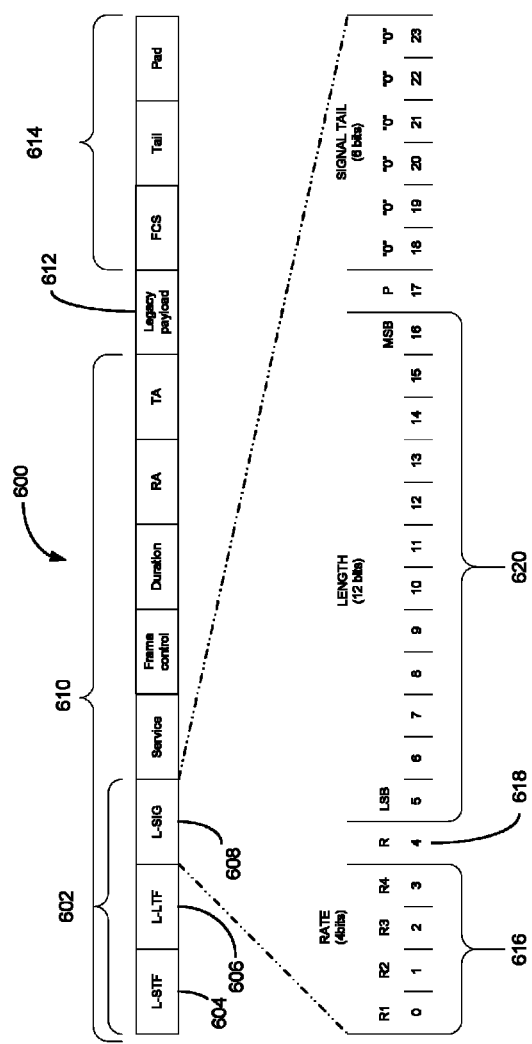
FIG. 6 is a block diagram of a data frame utilized to indicate the bandwidth of a communication channel in an embodiment.

FIG. 6 is a block diagram of an example data frame 600 that communication devices AP 14 and client 25-1 that includes bandwidth information to indicate the bandwidth of the data frame 600. In an embodiment, data frame 600 has a physical layer (PHY) preamble portion 602 that includes an L-STF 604, an L-LTF 606 and an L-SIG portion 608, a header portion 610, a payload portion 612 and a trailer portion 614. FIG. 6 illustrates the data frame 600 in a single bandwidth portion (e.g., 20 MHz or another suitable bandwidth). In an embodiment, the portion illustrated in FIG. 6 is duplicated in a plurality of bandwidth portions. In an embodiment, a receiving device that decodes any one of the bandwidth portions is able to extract the bandwidth information.

In an embodiment, a communication device utilizes one or more fields in the L-SIG portion 608 to indicate the bandwidth of the composite communication channel. For example, in an embodiment, a rate portion 616 of the L-SIG portion 608 of the header portion 610 is used to indicate a bandwidth of the composite communication channel.

In an embodiment, the data values in the rate portion 616 indicate the bandwidth of the composite communication channel via which the data frame 600 is transmitted. Table 1 is an example mapping between the values of the rate portion 616 and the composite communication channel bandwidth. In an embodiment, a reserved bit 618 is set to indicate that the data frame 600 includes bandwidth information of the composite communication channel in the rate portion 616.

TABLE 1

| Rate 616 | Throughput (Mbps) | Bandwidth(MHz) |
|---|---|---|
| 00001 | 6 | 20 |
| 00010 | 9 | 40 |
| 00011 | 12 | 80 |
| 00100 | 18 | 160 |

In another embodiment, a length field 620 of the L-SIG portion 608 is used to indicate that a data frame includes an indication of the bandwidth of the composite communication channel. In this embodiment, a length of the length field 620 is increased by a byte and the bandwidth information is included in the length field 620. In an embodiment a reserved bit 618 is used to indicate to a receiving communication device that the length field 620 includes bandwidth information. In an embodiment, an extra byte is added to an end of the legacy payload buffer field 612. The value present in the extra byte is utilized to indicate bandwidth information of the composite communication channel. In an embodiment the reserved bit 618 is used to indicate to a receiving communication device that the final byte of payload buffer 612 includes bandwidth information. In another embodiment, the rate field 616 is set to a special rate to indicate to a receiving communication device that a field in L-SIG, e.g., the final byte of the payload buffer 612, includes bandwidth information.

Figure 7:
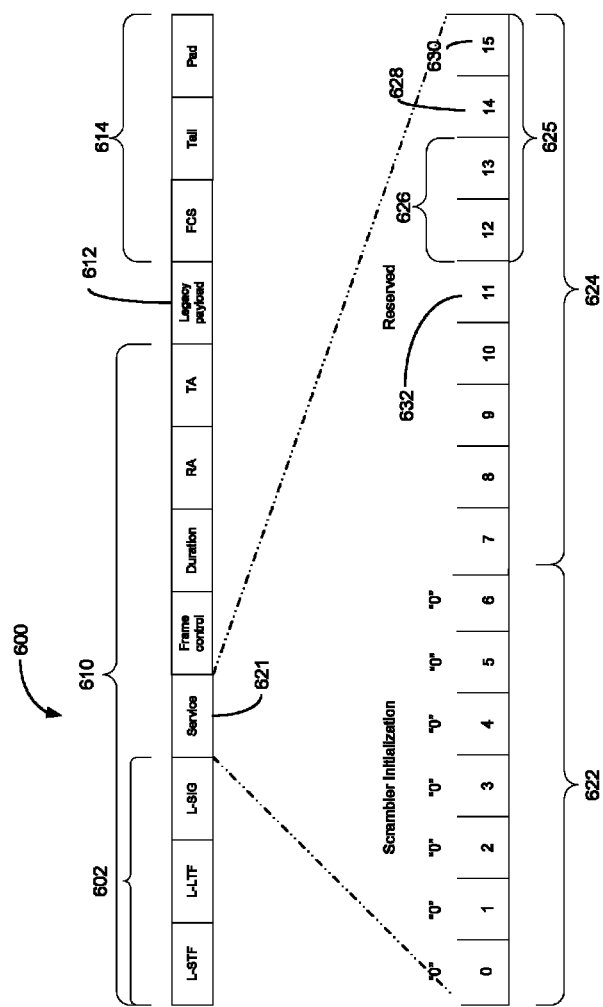
FIG. 7 is a block diagram of a data frame utilized to indicate the bandwidth of a communication channel in another embodiment.

FIG. 7 is another example of the data frame 600 wherein a header portion 610 is utilized to indicate bandwidth information, in an embodiment. In an embodiment, a service field 621 of the header portion 610 is utilized to indicate bandwidth information. In an embodiment, the service field 621 includes a scrambler initialization subfield 622 and a reserved subfield 624. In an embodiment, various settings of bits 626 of the reserved portion 624 of the service portion 621 are used to indicate different bandwidth information for the composite communication channel. In an embodiment, a bit 628 is used to indicate that the communication device is capable of forming composite communication channels having different bandwidths based on if channels are detected to be busy or idle. In an embodiment, bit 630 is used as an odd parity bit (i.e., bit 630 is used to ensure that the four bits 625 are an odd number of ones). In some embodiments, bit 632 is used to indicate that the data frame includes an indication of the bandwidth of a composite communication channel.

Figure 8:
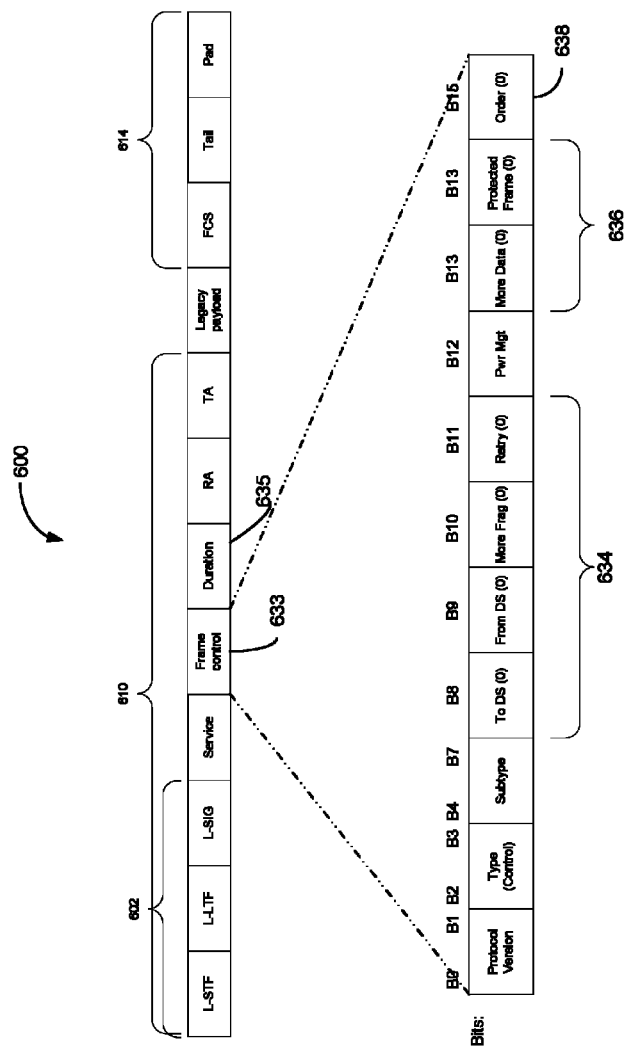
FIG. 8 is a block diagram of a data frame utilized to indicate the bandwidth of a communication channel in still another embodiment.

FIG. 8 is yet another example of the data frame 600 wherein a frame control field 633 of the header portion 610 is utilized to indicate bandwidth information, in an embodiment. In an embodiment, bits 634 are set to a pre-defined pattern, e.g. binary 0101 or another suitable pattern, to indicate that the data frame 600 includes bandwidth information of a composite communication channel. In an embodiment, bits 636 are utilized to indicate the bandwidth of the composite communication channel. In an embodiment, bit 638 is used as an odd parity bit.

In other embodiments, a duration field 635 of the header portion 610 is utilized to indicate the bandwidth of the composite communication channel. In an embodiment, the least significant byte (LSB) of the duration portion 635 is used to indicate the bandwidth of the composite communication channel.

Figure 9:
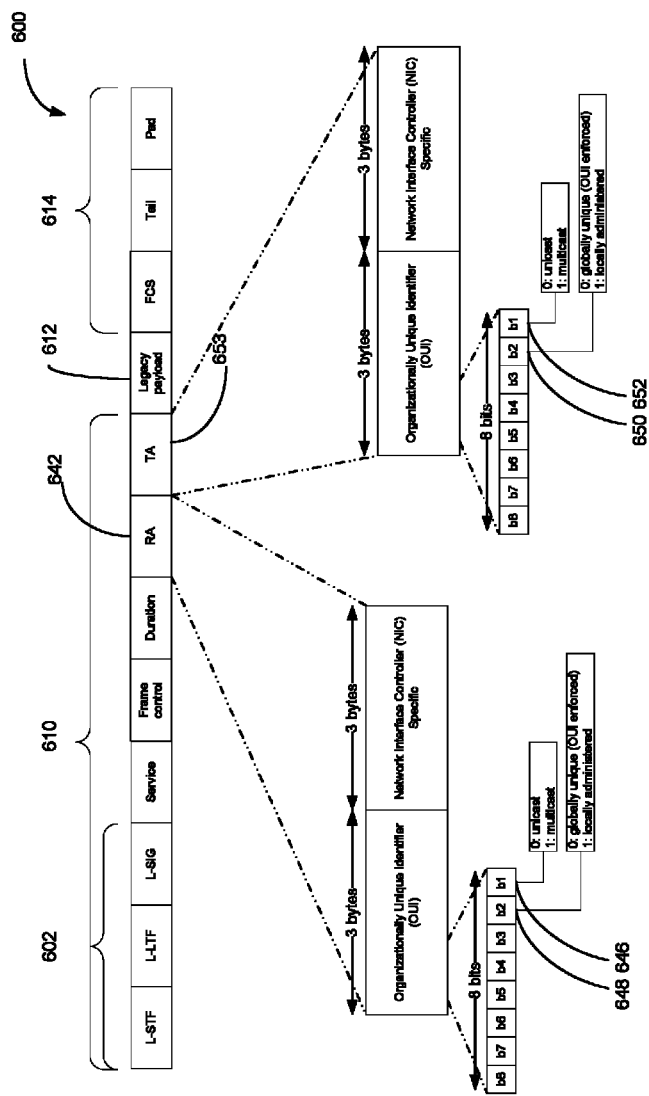
FIG. 9 is a block diagram of a data frame utilized to indicate the bandwidth of a communication channel in yet another embodiment.

FIG. 9 is still another example of the data frame 600 wherein a receiver address (RA) field 642 of the header 610 is utilized to indicate bandwidth information, in an embodiment. In an embodiment, bits 646 and/or 648 are set to appropriate values to indicate the bandwidth of the composite communication channel. In another embodiment, bits 650 and/or 652 of a transmitter address (TA) field 653 of the header 610 are utilized to indicate the bandwidth of the composite communication channel. In an embodiment, bits 648 and 646 are utilized to indicate the bandwidth of the composite communication channel, and bit 650 or bit 652 is utilized to indicate that the data frame 600 includes bandwidth information. In an embodiment, bit 652 is used as a parity bit. In other embodiments, other suitable bits of the RA field 642 and/or the TA field 653 are utilized to indicate bandwidth information.

Figure 10:
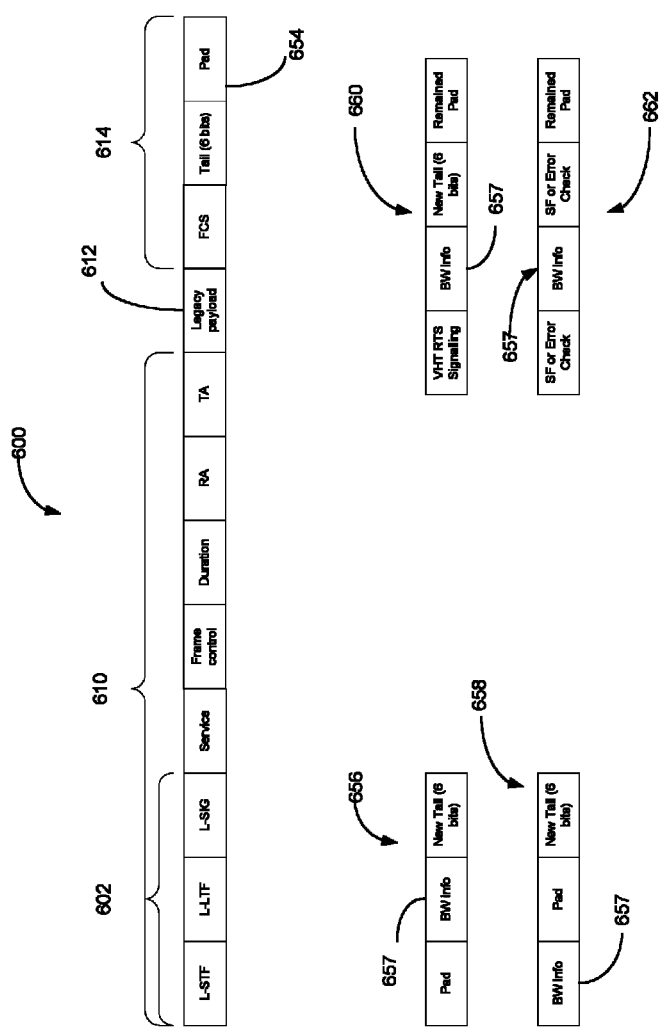
FIG. 10 is a block diagram of a data frame utilized to indicate the bandwidth of a communication channel in an embodiment.

FIG. 10 is an example of the data frame 600 wherein a trailer 614 is utilized to indicate bandwidth information, in an embodiment. In an embodiment, a pad portion 654 is utilized to indicate the bandwidth information of the composite communication channel. In other embodiments, the pad portion 654 is augmented with additional bit fields that are utilized to indicate bandwidth information. In an embodiment, the pad portion 654 includes one of fields 656, 658, 660 or 662.

Figure 11:
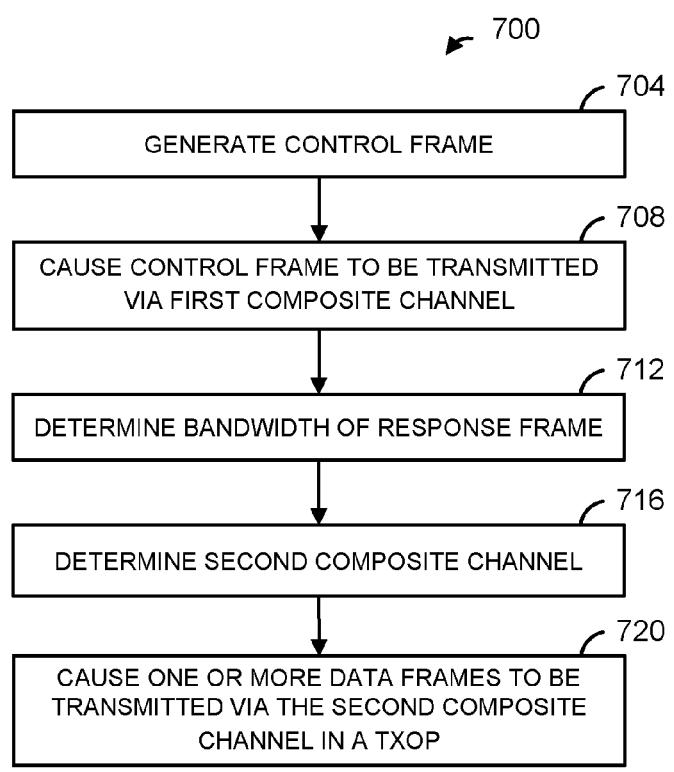
FIG. 11 is a flow diagram of an example method of determining a composite channel for a transmit opportunity period (TXOP), according to an embodiment.

FIG. 11 is a flow diagram of an example method 700 of determining a composite channel for a TXOP, according to an embodiment. In an embodiment, the method 700 is implemented by the network interface 16 of the AP 14 (FIG. 1). In an embodiment, the method 700 is implemented by the network interface 27 of the client device 25-1 (FIG. 1). In other embodiments, the method 700 is implemented by another suitable communication device.

At block 704, a control frame having a bandwidth is generated for transmission via a first composite channel. In an embodiment, the control frame is an RTS frame. In other embodiments, the control frame is another suitable type of control frame. In an embodiment, the bandwidth of the first composite channel corresponds to the bandwidth of the control frame. In an embodiment, the first composite communication channel comprises a plurality of communication channels.

At block 708, the communication device (e.g., network interface) causes the control frame to be transmitted via the first composite communication channel.

At block 712, a bandwidth of a response frame, received from another communication device in response to transmitting the control frame, is determined. The bandwidth of the response frame is determined using techniques such as described above, in some embodiments. For example, determining the bandwidth of the response frame comprises determining in which channels the response frame was received, in an embodiment. In an embodiment, the response frame is a CTS frame. In other embodiments, the response frame is another suitable type of frame.

At block 716, a second composite communication channel is determined based on the bandwidth of the response frame, wherein the second composite communication channel comprises at least one communication channel from the plurality of communication channels of the first composite communication channel.

At block 720, the communication device (e.g., network interface) causes one or more data frames to be transmitted to the other communication device via the second composite communication channel. In an embodiment, the second composite communication channel is for transmitting in TXOP of the device that implements the method 700. In an embodiment, the one or more data frames are transmitted in the TXOP.

Figure 12:
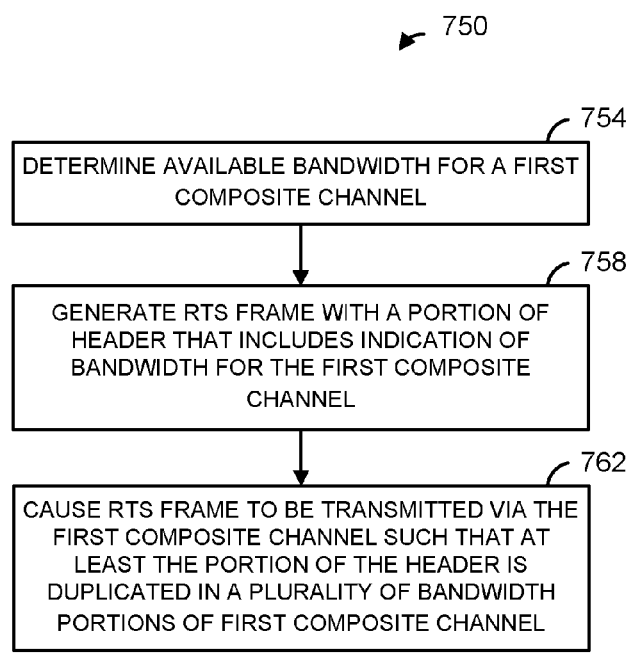
FIG. 12 is a flow diagram of another example method of determining a composite channel for a TXOP, according to another embodiment.

FIG. 12 is a flow diagram of another example method 750 of determining a composite channel for a TXOP, according to another embodiment. In an embodiment, the method 750 is implemented by the network interface 16 of the AP 14 (FIG. 1). In an embodiment, the method 750 is implemented by the network interface 27 of the client device 25-1 (FIG. 1). In other embodiments, the method 750 is implemented by another suitable communication device.

At block 754, available bandwidth for transmitting one or more data frames via a first composite communication channel is determined. The first composite communication channel comprises a plurality of communication channels.

At block 758, a control frame (e.g., an RTS frame) to indicate a request to transmit via the first composite communication channel is generated. The control frame includes a header, and a portion of the header includes information indicating the bandwidth of the first composite channel. In an embodiment, the information is included in reserved bits of a service field. In other embodiments, the information is included in another suitable field or fields.

At block 762, the communication device causes the control frame to be transmitted via the first composite communication channel. In an embodiment, at least the portion of the header is duplicated in a plurality of bandwidth portions of the first composite communication channel.

Figure 13:
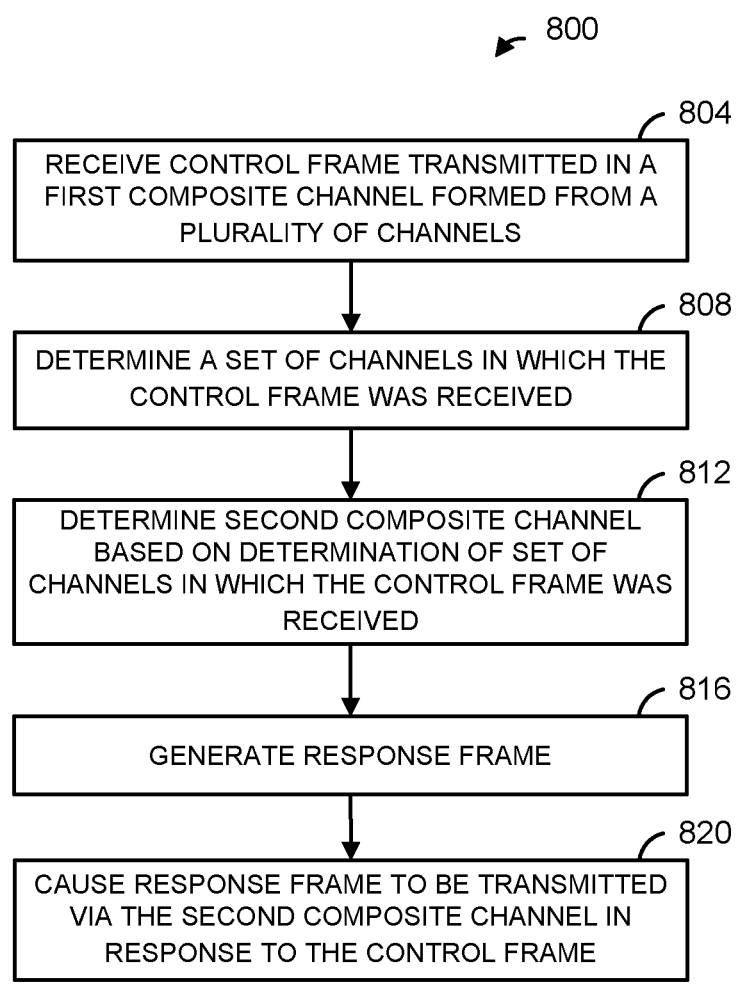
FIG. 13 is a flow diagram of an example method of responding to a request to send (RTS) control frame, according to an embodiment.

FIG. 13 is a flow diagram of an example method 800 of responding to a request to send (RTS) control frame, according to an embodiment. In an embodiment, the method 800 is implemented by the network interface 16 of the AP 14 (FIG. 1). In an embodiment, the method 800 is implemented by the network interface 27 of the client device 25-1 (FIG. 1). In other embodiments, the method 800 is implemented by another suitable communication device.

At block 804, a control frame is received, wherein the control frame was transmitted via a first composite communication channel having a bandwidth. The first composite communication channel comprises a plurality of communication channels.

At block 808, a set of communication channels of the plurality of communication channels in which the control frame was received is determined. The set of communication channels is determined using techniques such as described above, in some embodiments.

At block 812, a second composite communication channel is determined based on the determination of the set of communication channels in which the control frame was received.

At block 816, a response frame that indicates the second composite communication channel is generated. In an embodiment, the response frame is a CTS frame. In other embodiments, the response frame is another suitable frame.

At block 820, the communication device causes the response frame to be transmitted in response to the control frame received at block 804.

Figure 14:
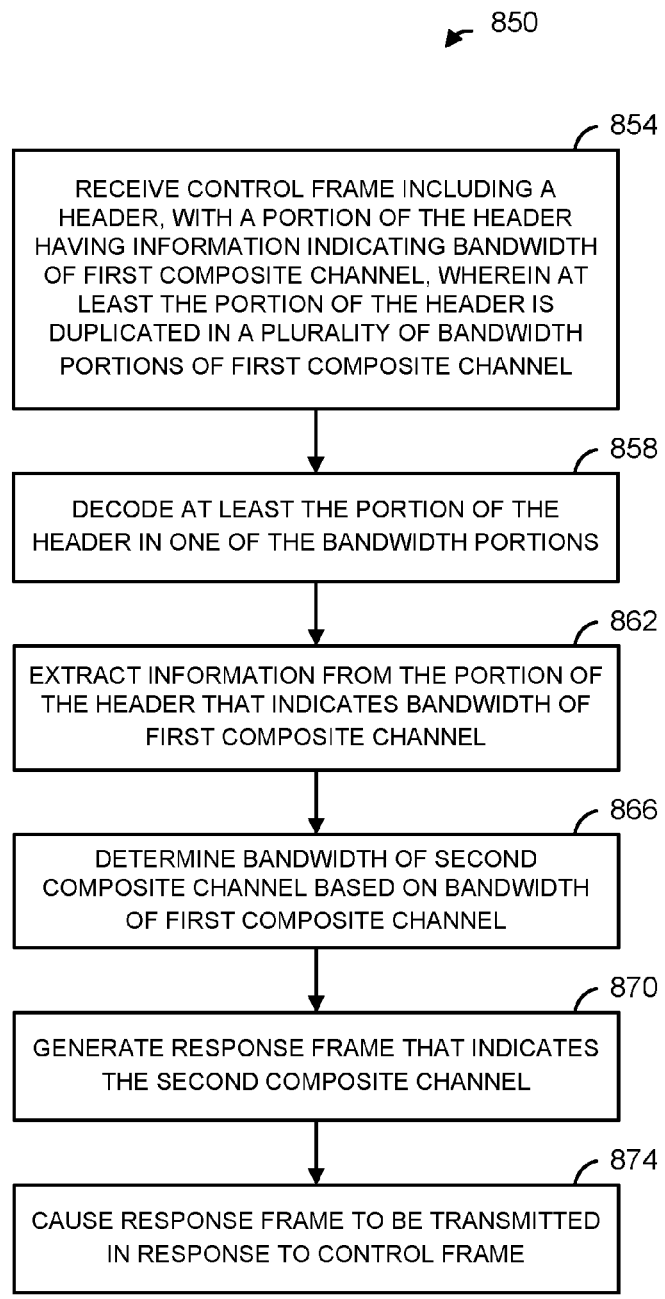
FIG. 14 is a flow diagram of another example method of responding to an RTS control frame, according to another embodiment.

FIG. 14 is a flow diagram of another example method 850 of responding to an RTS control frame, according to another embodiment. In an embodiment, the method 850 is implemented by the network interface 16 of the AP 14 (FIG. 1). In an embodiment, the method 850 is implemented by the network interface 27 of the client device 25-1 (FIG. 1). In other embodiments, the method 850 is implemented by another suitable communication device.

At block 854, a control frame is received, wherein the control frame was transmitted via a first composite communication channel having a bandwidth. The first composite communication channel comprises a plurality of communication channels. The received control frame includes a header, and a portion of the header includes information indicating a bandwidth of the first composite channel. The received control frame was transmitted such that at least the portion of the header was duplicated in a plurality of bandwidth portions of the first composite channel.

At block 858, at least the portion of the header of the control frame in one of the bandwidth portions of the first composite channel is decoded.

At block 862, the information from the portion of header of the control frame that indicates the bandwidth of the first composite communication channel is extracted.

At block 866, a bandwidth of a second composite communication channel is determined based on the bandwidth of the first composite communication channel.

At block 870, a response frame that indicates the second composite communication channel is generated. In an embodiment, the response frame is a CTS frame. In other embodiments, the response frame is another suitable frame.

At block 874, the communication device causes the response frame to be transmitted in response to the control frame received at block 854.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method implemented in a first communication device, the method comprising:
   generating a control frame having a bandwidth;
   causing the control frame to be transmitted via a first composite communication channel having the bandwidth of the control frame, wherein the first composite communication channel comprises a plurality of communication channels;
   determining a bandwidth of a response frame received from a second communication device in response to transmitting the control frame; and
   when the bandwidth of the response frame is different from the bandwidth of the control frame,
      determining a second composite communication channel based on the bandwidth of the response frame, wherein the second composite communication channel comprises at least one communication channel from the plurality of communication channels, and wherein the second composite communication channel has a bandwidth different than the bandwidth of the first composite communication channel, and
      causing one or more data frames to be transmitted to the second communication device via the second composite communication channel.

2. A method according to claim 1, wherein:
   the control frame is a request to send (RTS) frame; and
   the response frame is a clear to send (CTS) frame.

3. A method according to claim 1, wherein:
   the first composite communication channel comprises a plurality of bandwidth portions; and
   causing the control frame to be transmitted comprises causing a signal duplicated across the plurality of bandwidth portions to be transmitted.

4. A method according to claim 1, wherein:
   the second composite communication channel is for transmitting in a transmit opportunity period (TXOP) of the first communication device; and
   causing the one or more data frames to be transmitted to the second device via the second composite communication channel comprises causing the one or more data frames to be transmitted during the TXOP.

5. A method according to claim 4, further comprising:
   generating a subsequent control frame having a bandwidth different than the bandwidth of the second composite communication channel;
   causing the subsequent control frame to be transmitted during the TXOP via a third composite communication channel having the bandwidth of the subsequent control frame;
   determining a bandwidth of a subsequent response frame received in response to transmitting the subsequent control frame;
   determining a fourth composite communication channel based on the bandwidth of the subsequent response frame; and
   causing one or more subsequent data frames to be transmitted during the TXOP via the fourth composite communication channel.

6. A communication device, comprising:
   a network interface configured to:
      generate a control frame having a bandwidth,
      cause the control frame to be transmitted via a first composite communication channel having the bandwidth of the control frame, wherein the first composite communication channel comprises a plurality of communication channels, determine a bandwidth of a response frame received from a separate communication device in response to transmitting the control frame, and when the bandwidth of the response frame is different from the bandwidth of the control frame, determine a second composite communication channel based on the bandwidth of the response frame, wherein the second composite communication channel comprises at least one communication channel from the plurality of communication channels, and wherein the second composite communication channel has a bandwidth different than the bandwidth of the first composite communication channel, and cause one or more data frames to be transmitted to the separate communication device via the second composite communication channel.

7. A communication device according to claim 6, wherein:
the control frame is a request to send (RTS) frame; and
the response frame is a clear to send (CTS) frame.

8. A communication device according to claim 6, wherein:
the first composite communication channel comprises a plurality of bandwidth portions; and
the network interface is configured to cause the control frame to be transmitted via a first composite communication channel based on duplicating a signal across the plurality of bandwidth portions to be transmitted.

9. A communication device according to claim 6, wherein:
the second composite communication channel is for transmitting in a transmit opportunity period (TXOP) of the communication device; and
the network interface is configured to cause the one or more data frames to be transmitted during the TXOP.

10. A communication device according to claim 9, wherein the network interface is configured to:
generate a subsequent control frame having a bandwidth different than the bandwidth of the second composite communication channel,
cause the subsequent control frame to be transmitted during the TXOP via a third composite communication channel having the bandwidth of the subsequent control frame,
determine a bandwidth of a subsequent response frame received in response to transmitting the subsequent control frame,
determine a fourth composite communication channel based on the bandwidth of the subsequent response frame, and
cause one or more subsequent data frames to be transmitted during the TXOP via the fourth composite communication channel.

11. A method implemented in a communication device, the method comprising:
receiving a control frame having a bandwidth, the control frame having been transmitted via a first composite communication channel having the bandwidth of the control frame, wherein the first composite communication channel comprises a plurality of communication channels;
determining a set of communication channels of the plurality of communication channels in which the control frame was received;
determining a second composite communication channel based on the determination of the set of communication channels in which the control frame was received, wherein the second composite communication channel has a bandwidth different than the bandwidth of the control frame;
generating a response frame that indicates the second composite communication channel; and
in response to the control frame, causing the response frame to be transmitted in the second composite communication channel.

12. A method according to claim 11, wherein the control frame is a request to send (RTS) frame;
wherein the response frame is a clear to send (CTS) frame.

13. A method according to claim 11, wherein the second composite communication channel comprises a plurality of bandwidth portions;
wherein causing the response frame to be transmitted comprises causing a signal duplicated across the plurality of bandwidth portions to be transmitted.

14. A method according to claim 11, wherein generating the response frame comprises generating the response frame to include information that indicates the second composite communication channel.

15. A method according to claim 11, wherein determining the second composite communication channel comprises determining the second composite communication channel to include only one or more channels from the plurality of communication channels.

16. A method according to claim 11, wherein determining the second composite communication channel comprises determining the second composite communication channel to comprise only a valid combination, according to a communication protocol, of channels from the plurality of communication channels.

17. A method according to claim 11, wherein determining the second composite communication channel comprises determining whether a communication channel in which the control frame was received was idle for at least a non-zero time period prior to the start of the control frame.

18. A method according to claim 17, wherein determining whether the communication channel in which the control frame was received was idle for at least the non-zero time period prior to the start of the control frame comprises determining whether the communication channel in which the control frame was received was idle for at least a defined time period prior to the start of the control frame.

19. A communication device, comprising:
a network interface configured to
receive a control frame having a bandwidth, the control frame having been transmitted via a first composite communication channel having the bandwidth of the control frame, wherein the first composite communication channel comprises a plurality of communication channels,
determine a set of communication channels of the plurality of communication channels in which the control frame was received,
determine a second composite communication channel based on the determination of the set of communication channels in which the control frame was received, wherein the second composite communication channel has a bandwidth different than the bandwidth of the control frame,
generate a response frame that indicates the second composite communication channel, and
in response to the control frame, cause the response frame to be transmitted in the second composite communication channel.

20. A communication device according to claim 19, wherein:
the control frame is a request to send (RTS) frame; and
the response frame is a clear to send (CTS) frame.

21. A communication device according to claim 19, wherein:
the second composite communication channel comprises a plurality of bandwidth portions; and
the network interface is configured to cause a signal duplicated across the plurality of bandwidth portions to be transmitted.

22. A communication device according to claim 21, wherein the network interface is configured to generate the response frame to include information that indicates the second composite communication channel.

23. A communication device according to claim 19, wherein the network interface is configured to determine the second composite communication channel to include only one or more channels from the plurality of communication channels.

24. A communication device according to claim 19, wherein the network interface is configured to determine the second composite communication channel to comprise only a valid combination, according to a communication protocol, of channels from the plurality of communication channels.

25. A communication device according to claim 19, wherein the network interface is configured to determine whether a communication channel in which the control frame was received is to be included in the second composite channel based on determining whether the communication channel was idle for at least a non-zero time period prior to the start of the control frame.

26. A communication device according to claim 25, wherein the network interface is configured to determine whether the communication channel in which the control frame was received is to be included in the second composite channel based on determining whether the communication channel in which the control frame was received was idle for at least a defined time period prior to the start of the control frame.

* * * * *